United States Patent
Martensson

[11] Patent Number: 5,923,147
[45] Date of Patent: Jul. 13, 1999

[54] BATTERY CHARGER UNIT INCORPORATED IN A POWER CORD REEL HOUSING

[75] Inventor: Nils Martensson, Chobham, United Kingdom

[73] Assignee: IPR Industries, Ltd., Farnborough, United Kingdom

[21] Appl. No.: 08/947,304

[22] Filed: Oct. 8, 1997

[30] Foreign Application Priority Data

Oct. 30, 1996 [GB] United Kingdom .................. 9622585

[51] Int. Cl.$^6$ .............................. H02J 7/00; H02M 1/00
[52] U.S. Cl. ........................... 320/111; 320/113; 363/146
[58] Field of Search .................................... 320/105, 107, 320/112, 113, 111; 363/144, 146

[56] References Cited

U.S. PATENT DOCUMENTS

| | | | |
|---|---|---|---|
| 3,621,869 | 11/1971 | Albarran | 137/234.6 |
| 3,815,078 | 6/1974 | Fedrick | |
| 4,079,304 | 3/1978 | Brtandenburg | 320/105 |
| 4,108,264 | 8/1978 | Tanaka | 180/2 R |
| 4,215,306 | 7/1980 | Mace | 320/105 |
| 4,389,608 | 6/1983 | Dahl et al. | 320/137 |
| 4,466,581 | 8/1984 | Hill | |
| 4,489,223 | 12/1984 | Puckett et al. | 191/12.2 R |
| 4,893,037 | 1/1990 | Schwartz | 310/68 R |
| 5,358,461 | 10/1994 | Bailey, Jr. | 482/2 |
| 5,367,243 | 11/1994 | Wells et al. | 320/105 |

FOREIGN PATENT DOCUMENTS

| | | |
|---|---|---|
| A1-0692849 | 1/1996 | European Pat. Off. |
| A2-0716495 | 6/1996 | European Pat. Off. |
| 1165608 | 10/1969 | United Kingdom |
| A-2095209 | 9/1982 | United Kingdom |
| A-2158308 | 11/1985 | United Kingdom |

*Primary Examiner*—Peter S. Wong
*Assistant Examiner*—Gregory J. Toatley, Jr.
*Attorney, Agent, or Firm*—Oliff & Berridge,PLC

[57] ABSTRACT

The present invention relates to a battery charging unit comprising a housing having a current supply means provided therein for supplying current to an electrical or electronic apparatus located remote from the battery charging unit, coupling means provided on the housing for coupling the current supply means to a mains power supply, means for coupling the remote apparatus to the current supply means, comprising a cable, and a reel provided in the housing for storing the cable in the housing when the battery charging unit is not in use, and allowing the cable to be dispensed when required. This has the advantage that by having a device around which the cable remains wound during storage and from which the cable is simply unwound from the charging unit when it is required eliminates the unsightly and messy bunching of the cable which is a feature of known charging units.

9 Claims, 7 Drawing Sheets

BATTERY CHARGER UNIT INCORPORATED IN A POWER CORD REEL HOUSING

BACKGROUND OF THE INVENTION

The present invention relates to a battery charging unit for an electrical or electronic device, particularly, although not exclusively, for a cellular radio telephone.

Commonly, portable cellular radio telephones are provided with removable batteries as their current source. Typically, these batteries are Nickel—Cadmium (Ni—Cd) batteries which are rechargeable.

To recharge the battery, the battery is left attached to the cellular radio telephone, and is recharged "in situ" by means of a charging unit. The charging unit is coupled to a mains alternating current (AC) supply via a conventional plug arrangement (in the United Kingdom, this is a 3-pin arrangement well known to persons skilled in the art), and is coupled to the battery via a multi-conductor cable to the telephone and through internal circuitry, to the battery to be recharged. Respective matching contacts are provided, on the casing of the telephone and in a plug terminating the free end of the cable, to couple current to the telephone and battery. The charger, typically, may be a simple transformer/constant current generator or switch mode power supply, as is well known to persons skilled in the art. The telephone may be provided with control logic and means to sense one or more parameters, for example battery temperature, these being indicative of the charge state of the battery. By monitoring such parameters, one is able to ensure that the battery is optimally recharged. With this method of recharging, the battery is "fast-charged", that is where a constant current of, for example, 600–1000 mA is supplied to the battery to effect recharging. The telephone can still be used whilst the battery is being recharged.

A problem with storing these chargers is that the cable becomes entangled with other objects and is difficult to store. The user usually has to somehow wrap the cable—usually around the main body of the charging unit which can make it bulky. Commonly, during storage, this cable comes unwrapped and tangled, which can be fiddly and time consuming to untangle.

Among the many accessories available for portable cellular radio telephones, are so-called "travel chargers". These take the form of a charging unit incorporating a transformer/constant current generator, with a pin arrangement for coupling it to the mains supply. The casing for the charging unit is provided with a recess for receiving a spare battery. Contacts are provided within the recess for contacting matching contacts on the battery. A "trickle" current is supplied to the battery when the charging unit is coupled to the mains supply, thereby slow charging the battery received therein. The charging unit does not incorporate control logic for controlling fast charging, and therefore, is only capable of slow-charging a spare battery. This takes some time. There is the problem, therefore, that should the battery currently being used as the power supply for the telephone become discharged before the spare battery is recharged, then the telephone is out of operation. Unfortunately, when the recess may be perfectly located when using a wall mounted socket, should a floor mounted socket or any type of horizontally arranged socket be used, the recess may then be at such an angle that the battery will not stay in the recess or, if it does, does not make contact with the contacts properly, making charging impossible.

SUMMARY OF THE INVENTION

According to the present invention, there is provided a battery charging unit comprising a housing having a current supply means provided therein for supplying current to an electrical or electronic apparatus located remote from the battery charging unit, coupling means provided on the housing for coupling the current supply means to a mains power supply, means for coupling the remote apparatus to the current supply means, comprising a cable, and a reel provided in the housing for storing the cable in the housing when the battery charging unit is not in use, and allowing the cable to be dispensed when required.

This has the advantage that by having a device around which the cable remains wound during storage and from which the cable is simply unwound from the charging unit when it is required eliminates the unsightly and messy bunching of the cable which is a feature of known charging units.

Preferably the reel is rotatable, and the reel may be mounted on a rotatable spindle. Preferably the reel is manually windable, in order for a user to retract the cable back onto the reel following unwinding of the cable from the reel. Preferably the reel comprises a winding means in order for a user to manually wind the reel.

BRIEF DESCRIPTION OF THE DRAWINGS

The invention will now be described, by way of example only, with reference to the accompanying figures, of which.

DETAILED DESCRIPTION OF PREFERRED EMBODIMENTS

Figure 1:
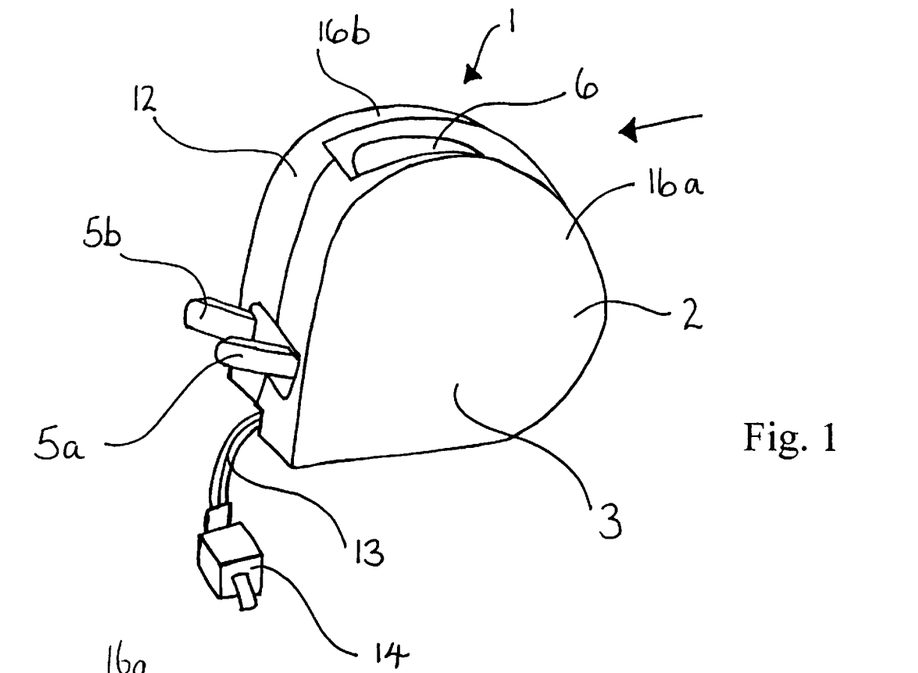
FIG. 1 is a perspective view of a charging unit of the present invention.

A battery charging unit 1 comprises a casing 2, made of a plastic material in a known manner.

Figure 3:
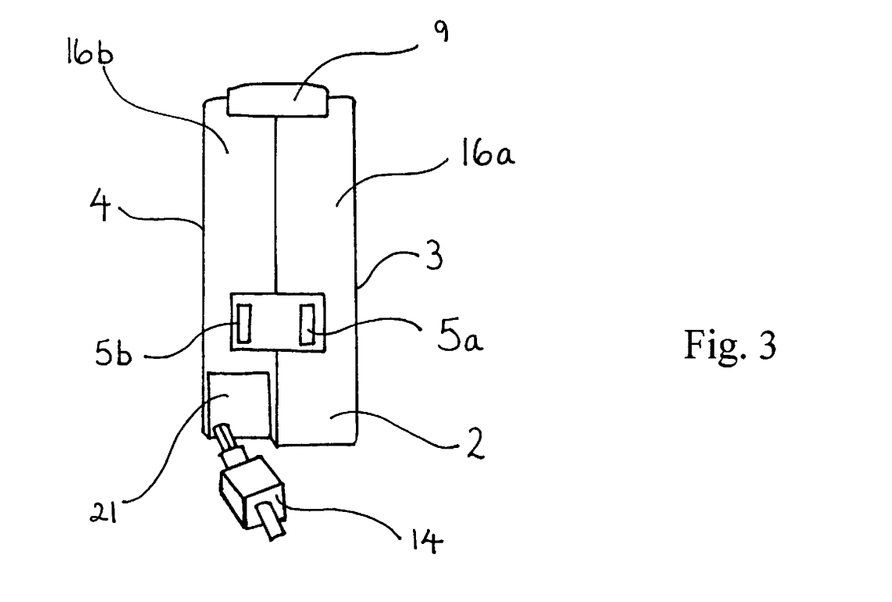
FIG. 3 is a view of a second portion of the side wall of the unit of FIG. 1 illustrating the plug pins and the retractable cable.

The casing 2 has teardrop-shaped front and rear faces 3,4 and a continuous side wall 12. In a portion of the side wall 12 are provided a pair of pins 5a,5b adapted to be received into a conventional electrical socket, for example, a wall socket to couple the battery charging unit 1 to a mains power supply. In the embodiment described herein, the pins 5a,5b are those for the U.S. mains supply, but may equally well be of the three-pin type for the UK, or any other known pin arrangement.

Figure 2A:
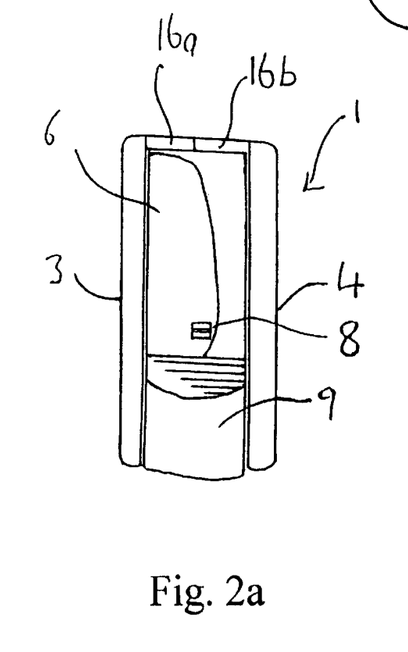
FIGS. 2a and 2b are views of a first portion of the side wall of the unit of FIG. 1 illustrating, in FIG. 2a the battery receiving recess uncovered, and, in FIG. 2b the battery receiving recess covered.

In another portion of the side wall 12 there is provided a recess 6 into which may be placed a battery 7 to be recharged. In the interior of the recess 6 are a number of contacts 8 for contacting matching contacts (not shown) provided on the battery 7. These contacts 8 are used for supplying current to the battery 7 for recharging, and to monitor the charge state of the battery 7 to ensure optimum charging. The recharging of the battery is carried out in any known manner. For clarity, the electrical couplings and internal circuitry are not illustrated in the drawings. The couplings are achieved by any suitable known means.

Figure 2B:
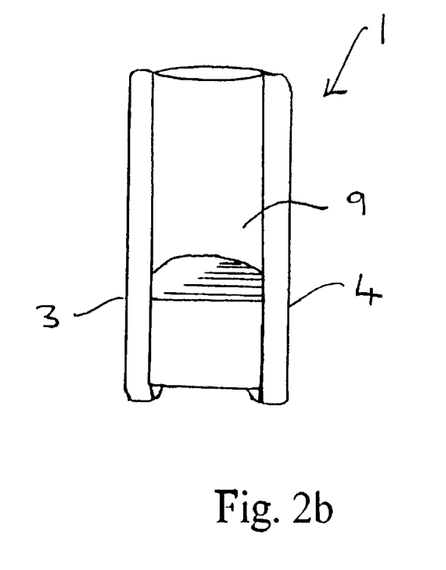

A slidable cover 9 is provided to cover the recess 6 to prevent damage to the recess 6, and, in particular, the contacts 8, when the charging unit 1 is not being used to charge a battery in this way.

Figure 5:
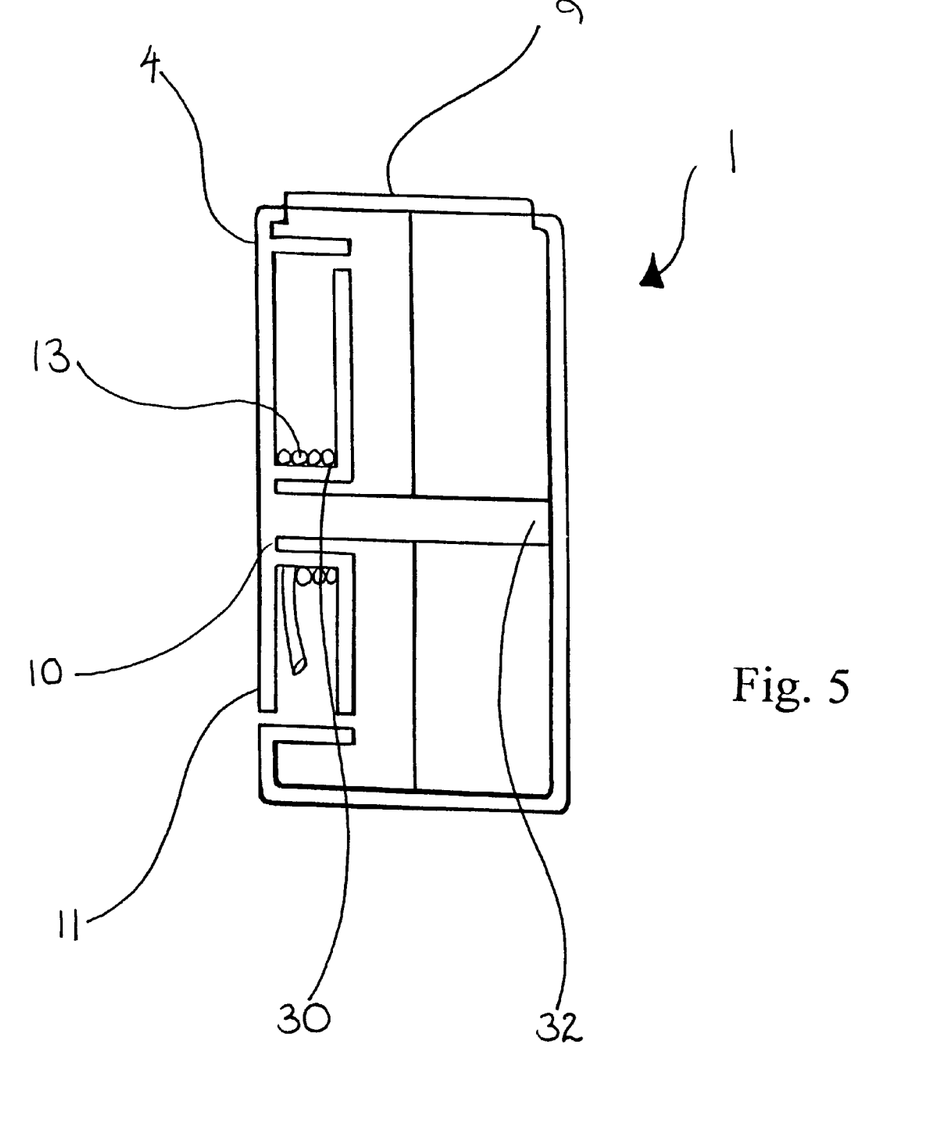
FIG. 5 is a sectional view from the side of the embodiment of FIGS. 1 to 4.

The charging unit 1 includes a rotatable reel 10 mounted within the casing 2, and substantially centrally located. The reel 10 comprises a rear plate 11 which, when the unit 1 is assembled, forms part of the rear face 4. The reel 10 further comprises a circular drum 30, around which a length of cable 13 is wound, and a front plate 31 which maintains the cable 13 on the reel 10. A spindle 32, centrally located on the reel 10 allows the reel 10 to be rotatably mounted within the casing 2. The length of cable 13 is wound around the reel 10 and terminates at its free end in a plug 14, configured to connect with a corresponding socket provided in the housing of a remote portable mobile cellular radio telephone (not shown). The other end is coupled to a transformer/current generator arrangement housed within the casing 2 to couple current from the mains power supply through the pins to the remote cellular radio telephone. As mentioned above, this coupling can be achieved in any known manner, but is not shown in the figures for clarity.

Figure 4:
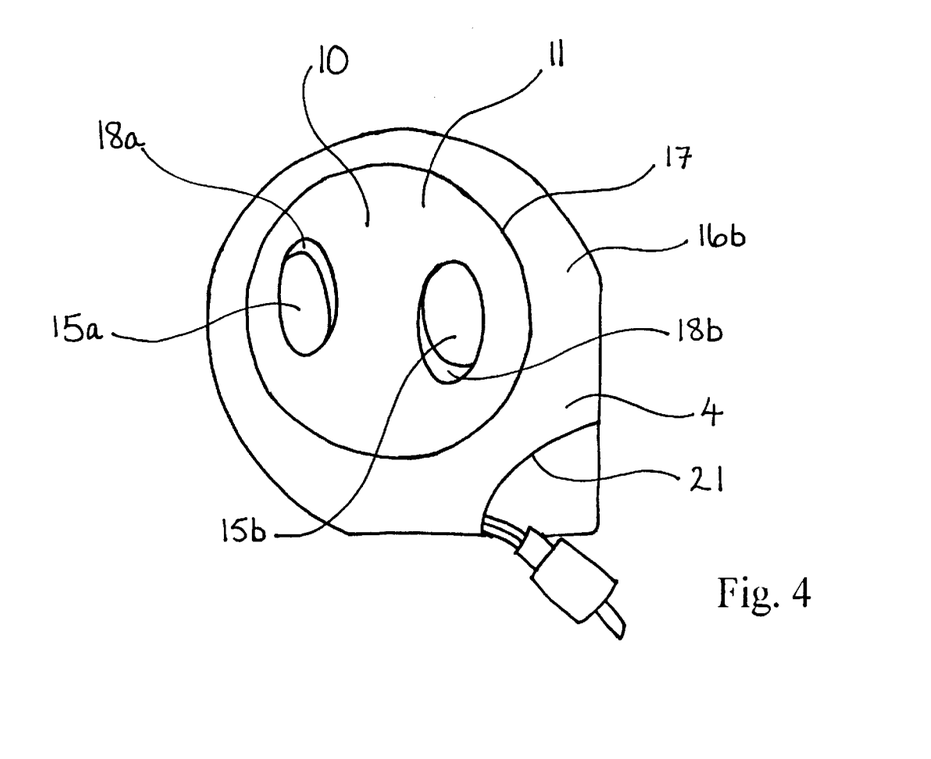
FIG. 4 is a rear view of the unit of FIG. 1.

The casing 2 is formed in two halves 16a,16b from a rigid plastics material. The reel 10, also made from a rigid plastics material, is rotatably mounted on one of the halves 16a by the spindle. The corresponding casing half 16b has a circular aperture 17 therein which fits around the reel plate 11 when assembled so as to form, with the reel plate 11, the rear face 4.

In use, the charging unit 1 is plugged into the mains supply using the external pins 5a, 5b and the cable plug 14 plugged into the cellular radio telephone housing to charge a battery in situ on the telephone. If required, another spare battery can be placed in the recess 6 for recharging. The process for the recharging of the two batteries is not relevant to the present invention, and is therefore not described in any detail herein.

When the cable 13 is being used for recharging, the cable 13 is pulled out to the length required through an aperture 21 provided in the casing 2, by unwinding it from the reel 10. When not in use, the cable 13 is retracted into the casing 2 by rewinding the reel 10. This is done by placing the second and third fingers in oval shaped grooves 15a,15b provided on the reel plate 11, and using a twisting motion of the hands to wind the reel 10. The grooves 15a,15b are shaped to include ridged portions 18a,18b against which the finger tips engage to allow the hand to wind up the reel 10 without slipping along the surface of the reel plate 11.

As described above, the battery charging unit 1 is provided with means to recharge a spare battery 7 by placing it in the recess 6. In use, the cover 9 is retracted and the spare battery 7 inserted in the recess 6 so that the contacts 8 contact the matching contacts on the spare battery 7.

Figure 6:
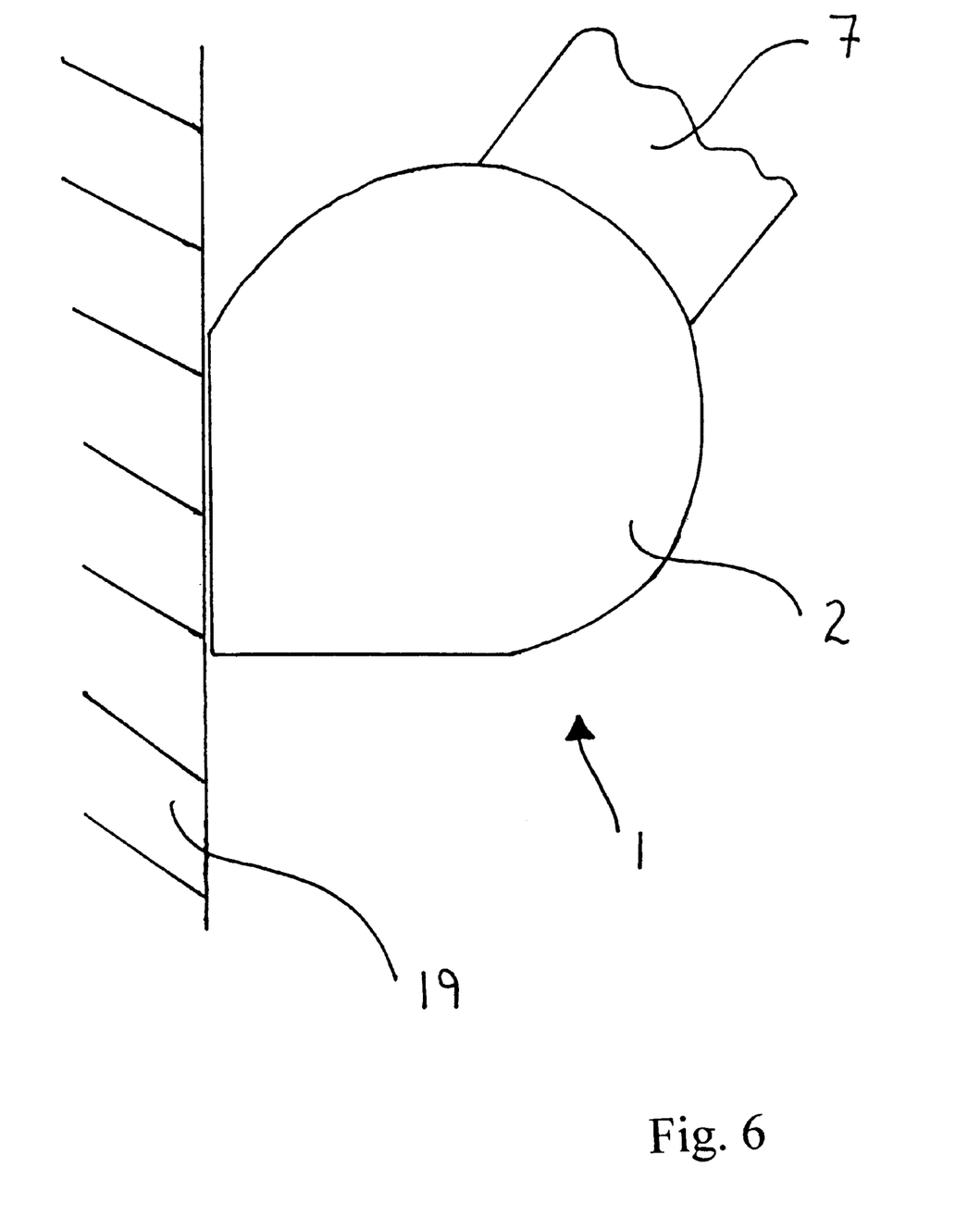
FIG. 6 schematically illustrates the charging unit of FIG. 1 plugged into a wall mounted mains socket with a spare battery in situ.
Figure 7:
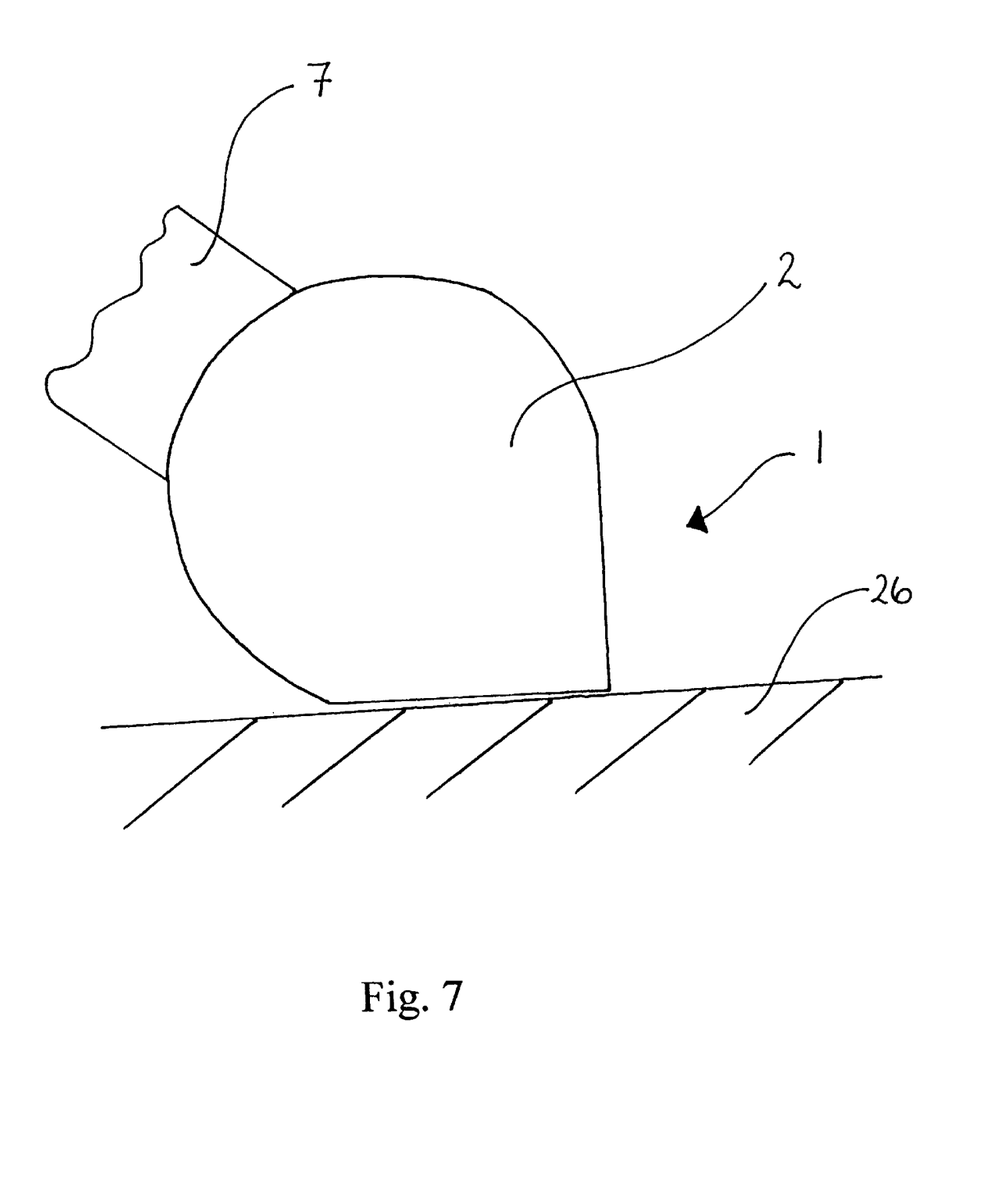
FIG. 7 schematically illustrates the charging unit of FIG. 1 plugged into a floor mounted mains socket with a spare battery in situ.

The recess 6 is located in the side wall 12 at such a location, and dimensioned such that, when the charging unit 1 is plugged into a socket mounted on a wall 19 as illustrated in FIG. 6, the spare battery 7 is oriented at an acute angle—preferably around 45 degrees—to the vertical so that the battery 7 remains in the recess 6 under gravity and the frictional fit within the recess 6. Similarly, when the charging unit 1 is plugged into a socket mounted on the floor 20, as illustrated in FIG. 7, the battery 7 remains at an acute angle—again preferably around 45 degrees—to the vertical, and, therefore, also remains in the recess.

Figure 8:
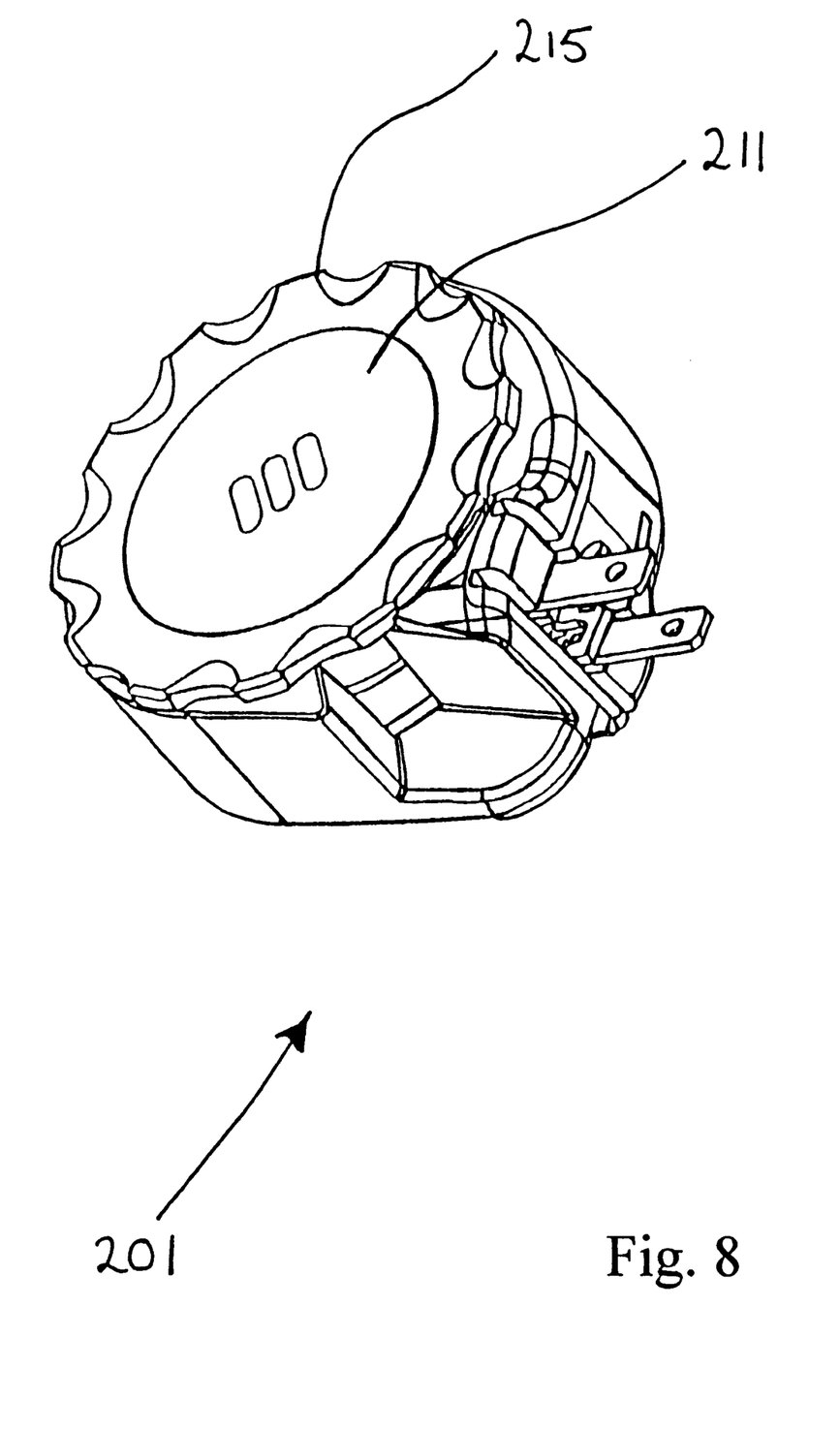
FIG. 8 is a perspective view of a second preferred embodiment of the present invention.

Referring now to FIG. 8, this shows a second preferred embodiment of a battery charging unit 201 according to the present invention. This embodiment is similar to the first preferred embodiment, however instead of oval shaped grooves 15a, 15b being provided on the reel plate 11 in order for a user to wind the cable back onto the reel following use of the battery charging unit, a scalloped edge 215 is provided on the reel plate 211, the scalloped edge providing a series of recesses around the reel plate 211. This is easily graspable by a user, who would place his or her fingertips in the recesses provided by the scalloped edge, and employ a twisting motion of the hand in order to wind the cable back onto the reel.

Figure 9:
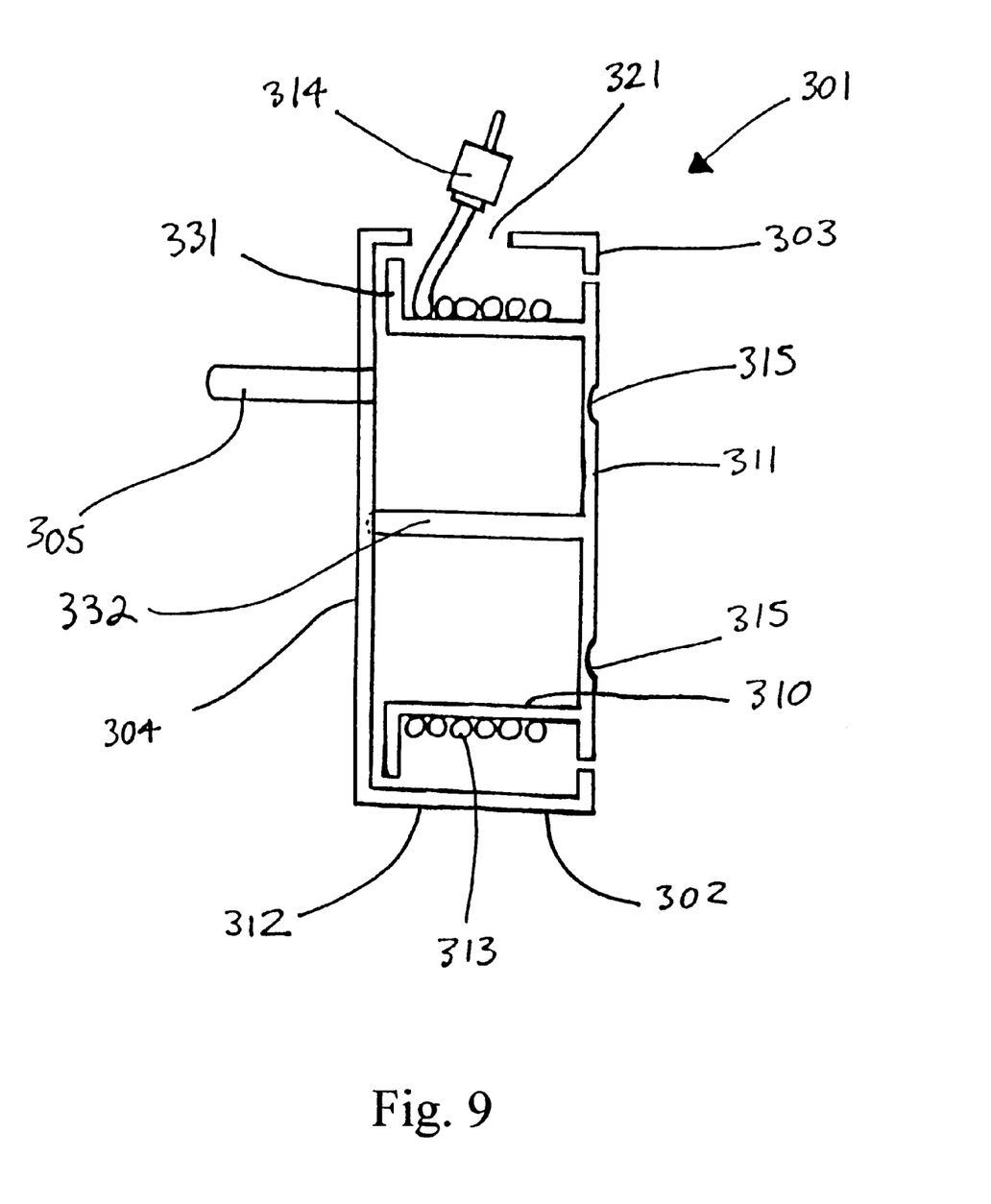
FIG. 9 is a cross-sectional view from the side of a further embodiment of a battery charging unit according to the present invention.

Referring now to FIG. 9, this shows a further embodiment of a battery charging unit according to the present invention. The battery charging unit 301 is cylindrical, having a casing 302 comprising a front face 303, a rear face 304 and a single continuous side wall 312. A pair of pins 305 are provided on the rear face 304 of the battery charging unit 301. The charging unit 301 includes a rotatable reel 310, mounted substantially centrally within the casing 302, the reel 310 comprising a hollow circular drum 230, around which a length of cable 313 is wound, a front plate 311, which forms part of the front face 303, and a rear plate 331 which maintains the cable on the reel 310. A spindle 332 which is centrally located on the reel 310 allows the reel 310 to be rotatably mounted within the casing 302. The cable 313 terminates at its free end in a plug 314, as described in previous embodiments, the plug 314 and cable 313 exiting the casing 302 at an aperture 321 formed in the side wall 312 of the casing 302. The present embodiment is used in the same way as the embodiment of FIG. 1, the cable 313 being retracted back onto the reel 310 by a user utilising the grooves 315 provided on the front plate 311 as previously described in relation to previous embodiments. The transformer/current generator components of the battery charging unit are again arranged under the reel 310, within the drum 330.

As will be understood to a person skilled in the art, various modifications are possible within the scope of the present invention. For example, other shapes of battery charging unit are possible. The pin arrangement can be selected to correspond with the plug and socket convention of the region where the unit is to be used. Similarly, the recess of those embodiments incorporating a recess for a battery is dimensioned to receive the appropriate battery. The recess can also be dimensioned to receive the whole telephone rather than simply the battery. The battery charger can be used to recharge batteries for other electrical or electronic apparatus, for example a portable personal computer.

I claim:

1. A battery charging unit comprising a housing having a current supply means provided therein for supplying current to an electrical or electronic apparatus located remote from the battery charging unit, coupling means provided on the housing for coupling the current supply means to a mains power supply, means for coupling the remote apparatus to the current supply means, comprising a cable, and a reel provided in the housing for storing the cable in the housing when the battery charging unit is not in use, but operable to dispense the cable when required, wherein the reel includes a reel plate which defines part of the wall of the housing.

2. A battery charging unit according to claim 1, wherein the reel is rotatable.

3. A battery charging unit according to claim 2, wherein the reel is mounted on a rotatable spindle.

4. A battery charging unit according to claim 1, wherein the reel plate includes a pair of recesses formed on the plate, the recesses being arranged to receive a pair of finger tips to allow the reel to be manually rotatable.

5. A battery charging unit according to claim 1, wherein the reel plate comprises a scalloped edge providing a series of recesses around the reel plate.

6. A battery charging unit according to claim 1, characterised in that the cable exits the housing through an aperture in the housing.

7. A battery charging unit according to claim 1, characterised in that said battery charging unit also comprises means for mounting a battery within the housing such that current is supplied from the current supply means to the battery mounted therein, the battery mounting means being provided such that the battery is mounted at an orientation whereby the longitudinal axis of the battery is at an acute angle to the horizontal and vertical axes of the housing.

8. A battery charging unit according to claim 7, wherein the acute angle is approximately 45 degrees.

9. A battery charging unit according to claim 7, wherein the battery to be mounted within the housing is part of an electrical or electronic apparatus, the whole apparatus being receivable in the recess.

* * * * *